(12) United States Patent
Kozaki et al.

(10) Patent No.: US 9,332,144 B2
(45) Date of Patent: May 3, 2016

(54) IMAGE FORMING APPARATUS

(75) Inventors: Daisuke Kozaki, Kiyosu (JP); Takeru Morinaga, Seto (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 51 days.

(21) Appl. No.: 13/328,277

(22) Filed: Dec. 16, 2011

(65) Prior Publication Data
US 2012/0155941 A1 Jun. 21, 2012

(30) Foreign Application Priority Data

Dec. 16, 2010 (JP) ................................ 2010-280384

(51) Int. Cl.
*H04N 1/00* (2006.01)
*G03G 21/00* (2006.01)
*H04N 1/12* (2006.01)

(52) U.S. Cl.
CPC ....... *H04N 1/00604* (2013.01); *H04N 1/00525* (2013.01); *H04N 1/00649* (2013.01); *H04N 1/12* (2013.01)

(58) Field of Classification Search
CPC ......... B65H 2405/111646; B65H 2405/11164; B65H 2405/1117; H04N 1/00604; H04N 1/00535; G03G 2215/00392
USPC ................. 399/367; 271/3.01, 171, 213, 224
See application file for complete search history.

(56) References Cited

U.S. PATENT DOCUMENTS

| | | | |
|---|---|---|---|
| 5,261,651 A * | 11/1993 | Ishida | 271/3.2 |
| 6,070,868 A | 6/2000 | Nagato et al. | |
| 6,469,811 B1 | 10/2002 | Tamura | |
| 6,612,561 B2 | 9/2003 | Sekine | |
| 7,302,223 B2 * | 11/2007 | Kawashima | 399/392 |
| 7,938,390 B2 * | 5/2011 | Shingai | 271/3.14 |
| 2002/0056957 A1 * | 5/2002 | Sekine | 271/3.14 |
| 2005/0141936 A1 | 6/2005 | Kawashima | |
| 2009/0218749 A1 | 9/2009 | Shingai | |
| 2010/0252987 A1 | 10/2010 | Furuyama et al. | |

FOREIGN PATENT DOCUMENTS

| | | |
|---|---|---|
| CN | 101860646 A | 10/2010 |
| EP | 1912421 A1 | 4/2008 |
| JP | HEI 2-66549 | 5/1990 |

(Continued)

OTHER PUBLICATIONS

JP Office Action dtd Jan. 29, 2013, JP Appln. 2010-280384, English translation.
JP Office Action dtd May 7, 2013, JP Appln. 2010-280384, English translation.
Notification of the First Office Action with Search Report in related Chinese Patent Application No. 201110396727.2 mailed Jan. 6, 2014.

(Continued)

*Primary Examiner* — Blake A Tankersley
*Assistant Examiner* — Ruben Parco, Jr.
(74) *Attorney, Agent, or Firm* — Banner & Witcoff, Ltd.

(57) ABSTRACT

An image forming apparatus including an automatic document feeder (ADF) that transports a document is provided. The ADF unit includes a subtray that is openable and closable. When transporting a document, the subtray is opened and a document to be transported is fed into a space below a guide member. At this time, surfaces of the subtray and a main tray are used as a feed tray. The document that has been transported is discharged onto a guide member and is further transported onto the surface of the second tray. At this time, the surface of the second tray and the surface of the guide member are used as a discharge tray.

18 Claims, 5 Drawing Sheets

(56) References Cited

FOREIGN PATENT DOCUMENTS

| | | | |
|---|---|---|---|
| JP | 7-179259 A | | 7/1995 |
| JP | 2000-128367 A | | 5/2000 |
| JP | 2001-097560 A | | 4/2001 |
| JP | 2002-145457 A | | 5/2002 |
| JP | 2006282379 A | * | 10/2006 |
| JP | 2007037043 A | | 2/2007 |
| JP | 2008011541 A | | 1/2008 |
| JP | 2010245624 A | | 10/2010 |

OTHER PUBLICATIONS

Japanese Notice of Interrogation with Report of Reexamination by Examiner before Appeal (mailed Oct. 22, 2013) in related Japanese Application No. 2010-280384 (Appeal/Trial No. Appeal 2013-015129).

Mar. 25, 2015—(EP) Office Action—App 11192928.7.

Notice of Reasons for Rejection in corresponding Japanese Application No. 2013-162982, dated Apr. 15, 2014.

\* cited by examiner

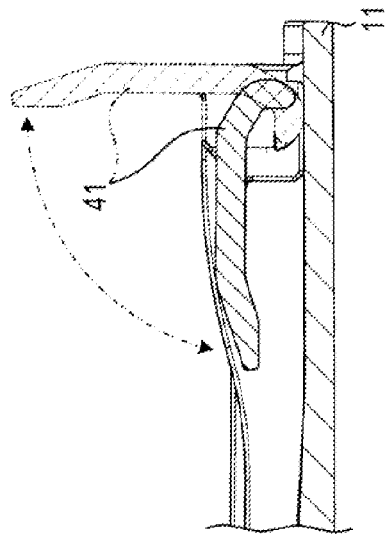
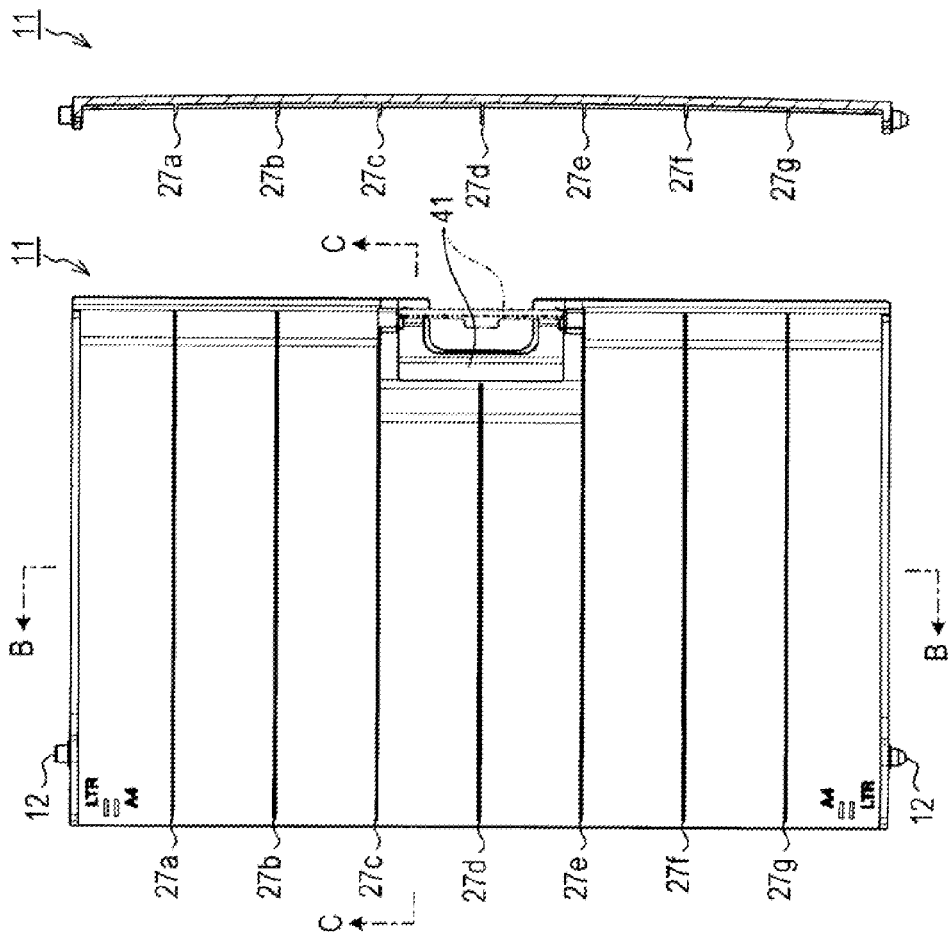

IMAGE FORMING APPARATUS

CROSS REFERENCE TO RELATED APPLICATION

This application claims priority from Japanese Patent Application No. 2010-280384, filed on Dec. 16. 2010, the entire subject matter of which is incorporated herein by reference.

BACKGROUND

A known image forming apparatus includes an automatic document feeder (hereinafter referred to as ADF), which has a document feed tray that is rotatable to a position at which the document feed tray covers a document feed slot and has a document discharge tray that is rotatable to a position at which the document discharge tray covers a document discharge slot.

With such an image forming apparatus, the document feed tray covers the document feed slot and the document discharge tray covers the document discharge slot when the ADF is not used, whereby foreign objects can be prevented from entering into the apparatus body through the document feed slot and the document discharge slot.

However, in the case of the image forming apparatus described above, the document feed tray and the document discharge tray are rotatable around different rotation shafts. Therefore, it is necessary to dispose bearings that support the rotation shafts in the apparatus, and the space for the bearings makes the rotation mechanism considerably larger.

Moreover, the image forming apparatus described above, which has a mechanism such that, when a user rotates the document feed tray, the document discharge tray is rotated together with the document feed tray. This configuration requires a considerably complex rotation mechanism.

Furthermore, in the case of the image forming apparatus described above, when the document feed tray is opened to a position at which the document feed tray can feed a document, the document discharge tray moves up and down below the document feed tray that is opened. Therefore, it is necessary to dispose a space that allows the document discharge tray to move up and down below the document feed tray that is opened. The height of the image forming apparatus is increased due to the space, whereby it becomes difficult to reduce the height of the apparatus.

SUMMARY

Illustrative aspects can provide an image forming apparatus, which includes a tray that is used for feeding and discharging a document, wherein the tray can be configured to allow a reduction in the height of the image forming apparatus.

BRIEF DESCRIPTION OF THE DRAWINGS

FIG. 5A illustrates the back surface of the subtray, FIG. 5B is a sectional view of the subtray taken along line B-B of FIG. 5A, and FIG. 5C is a partially enlarged sectional view of the subtray taken along line C-C of FIG. 5A.

DETAILED DESCRIPTION

Figure 1A:
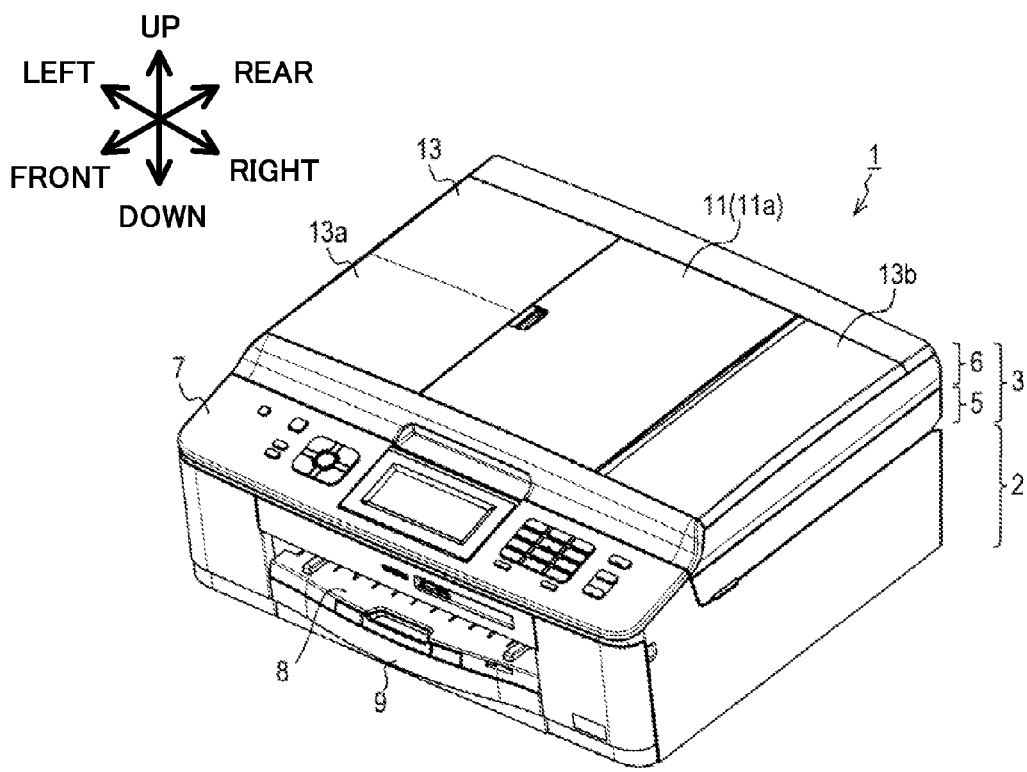
FIGS. 1A and 1B illustrate an example of a multifunction device including an image reading apparatus, FIG. 1A being a perspective view illustrating a state in which a subtray of the image reading apparatus is closed, and FIG. 1B being a perspective view illustrating a state in which the subtray of the image reading apparatus is open.

An illustrative embodiment will be described in detail with reference to the accompanying drawings. An image forming apparatus according to illustrative aspects applies to an image reading apparatus in a multifunction device 1 as shown in FIG. 1.

The multifunction device 1 has functions as an image reading apparatus (scanner) and also performs other functions (e.g. the functions as a printer, a copier, a facsimile, and the like). In the following description, in order to clearly describe the positional relationship of parts of the multifunction device 1, the directions of up, down, left, right, front, and rear indicated in the figures will be used.

The multifunction device 1 includes a main unit 2 and a scanner unit 3 disposed on the main unit 2. The scanner unit 3 is configured so that the front end thereof can be rotated up and down around the back end thereof. Thus, the scanner unit 3 can be displaced between a position at which the scanner unit 3 closes an upper opening (not shown) in the main unit 2 and a position at which the upper opening is opened.

The scanner unit 3 is a structure in which the ADF is incorporated in the cover part of a flat bed (hereinafter referred to as "FB") type image scanner.

The scanner unit 3 includes an FB body 5 and an ADF unit 6 that covers the upper side of the FB body 5.

The ADF unit 6 is configured so that the front end thereof can be rotated up and down around the back end thereof. Thus, the ADF unit 6 can be moved between a position at which the ADF unit 6 covers a document placing surface on the upper side of the FB body 5 and a position at which the document placing surface is exposed.

An operation panel 7 through which a user operates the multifunction device 1 is disposed on an upper front part of the main unit 2. A discharge slot 8 through which a printed recording medium is discharged is disposed below the operation panel 7. A sheet feed cassette 9 in which recording media to be printed are stored is disposed below the output slot 8.

Figure 1B:
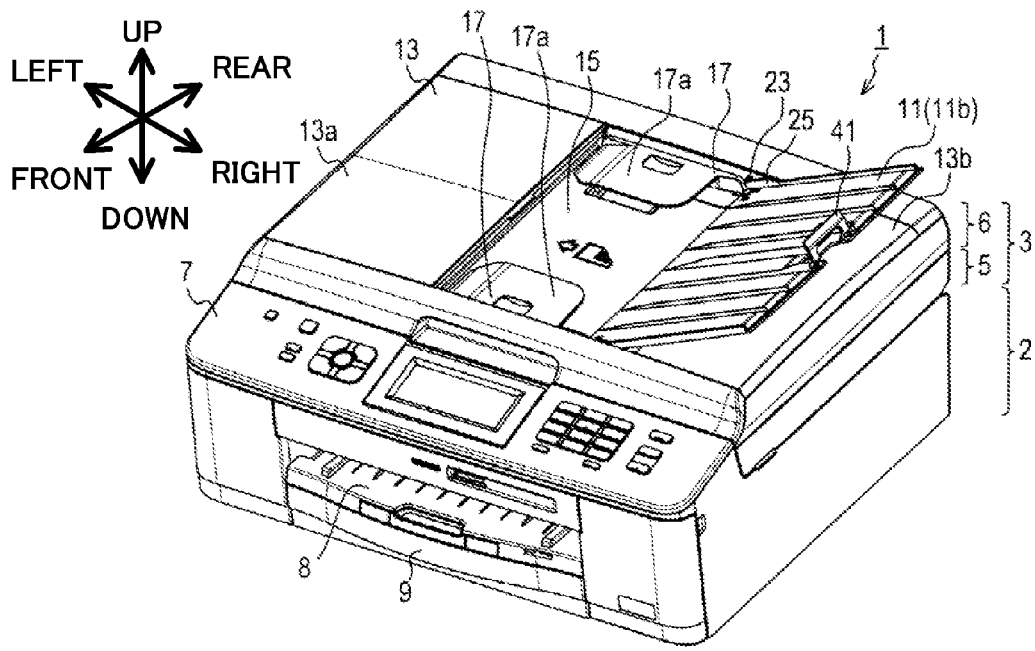
Figure 2:
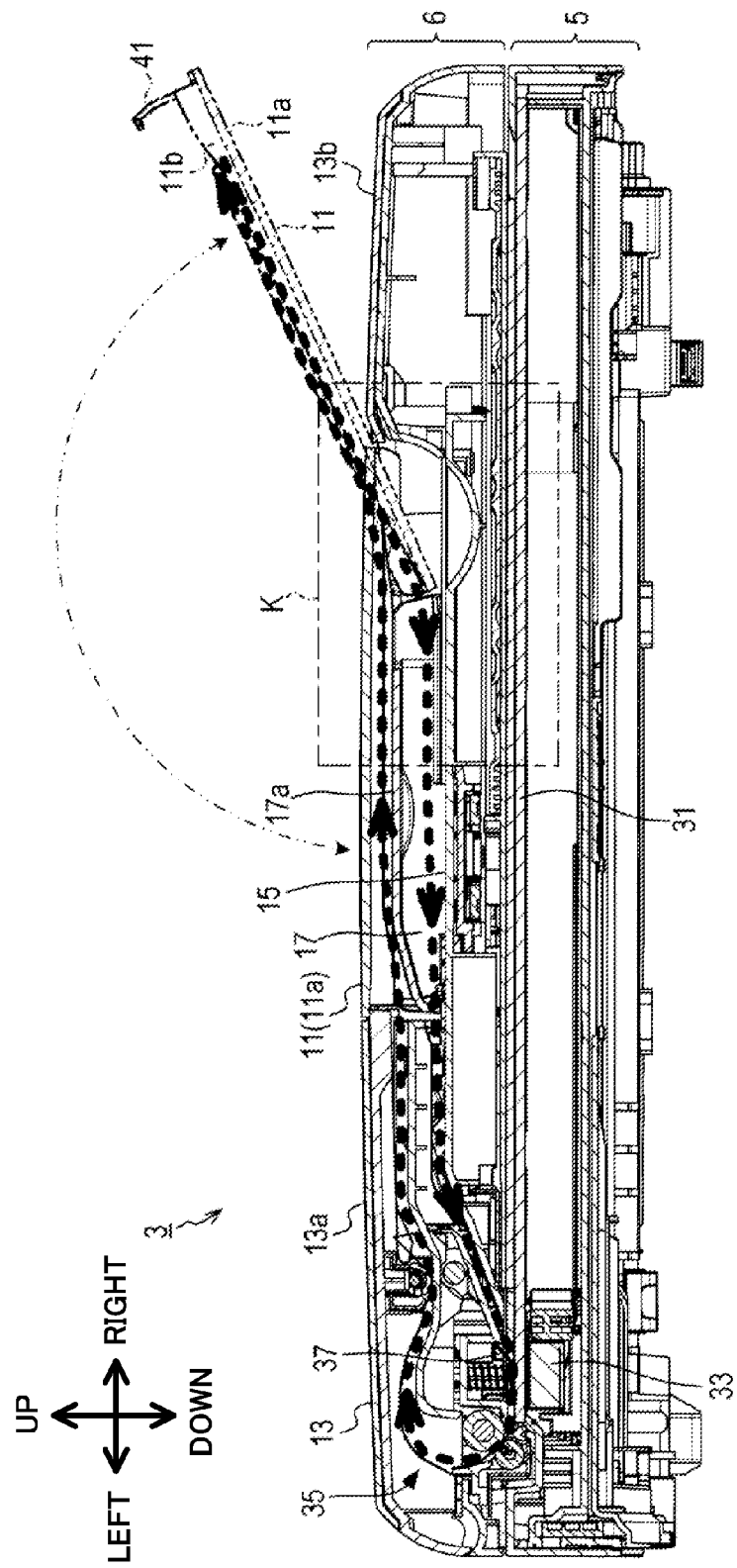
FIG. 2 is a longitudinal sectional view of the image reading apparatus.
Figure 3:
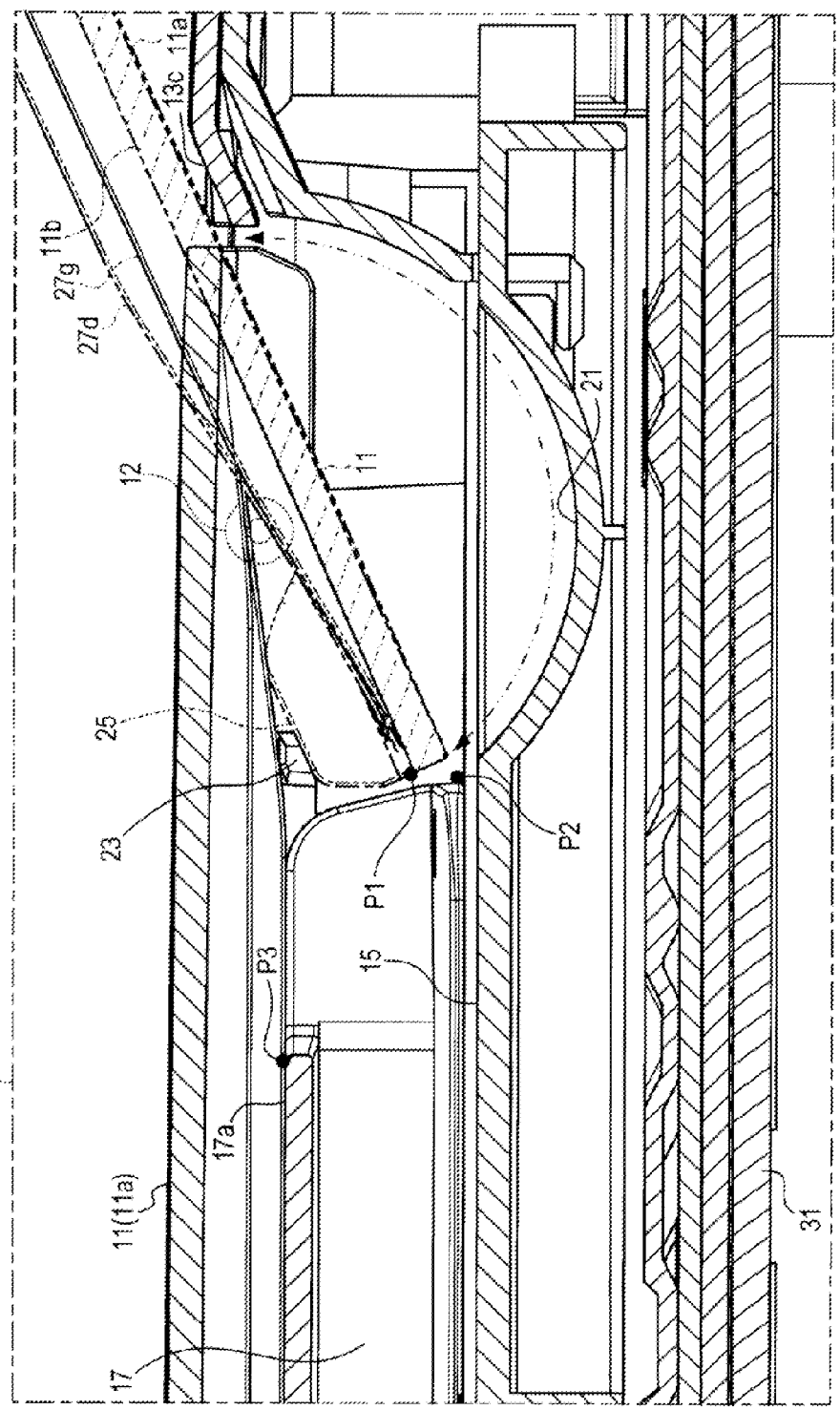
FIG. 3 is an enlarged view of region K of FIG. 2.

As illustrated in FIGS. 1A and 1B, a subtray 11 is disposed on the upper side of the ADF unit 6. As illustrated in FIGS. 2 and 3, the subtray 11 can be rotated around a rotation member such as a rotation shaft 12. The subtray 11 is closed when rotated to a position (illustrated by the solid line in FIGS. 2 and 3) at which an end portion thereof that is farther from the rotation shaft 12 is at the leftmost position.

As illustrated in FIG. 1A, a surface 11a of the subtray 11 faces upward when the subtray 11 is closed. At this time, the surface 11a of a subtray 11 forms a flat plane with the upper cover 13 on right and left sides of the sub-tray 11, whereby the surface 11a of the subtray 11, and the surfaces 13a and 13b of the upper cover 13 form a substantially flat surface.

The subtray 11 is opened to an open position when rotated to a position (illustrated by the two-dot chain line in FIGS. 2 and 3) at which the end portion thereof that is farther from the rotation shaft 12 is at the rightmost position. In this state, a main tray 15 and document guides 17 disposed on the main tray 15 are exposed to the outside on the upper side of the ADF unit 6. It will be appreciated that one document guide that spans the main tray 15 may be used although an illustrative embodiment employing a pair of document guides 17 is described herein.

Figures 4A, 4B:
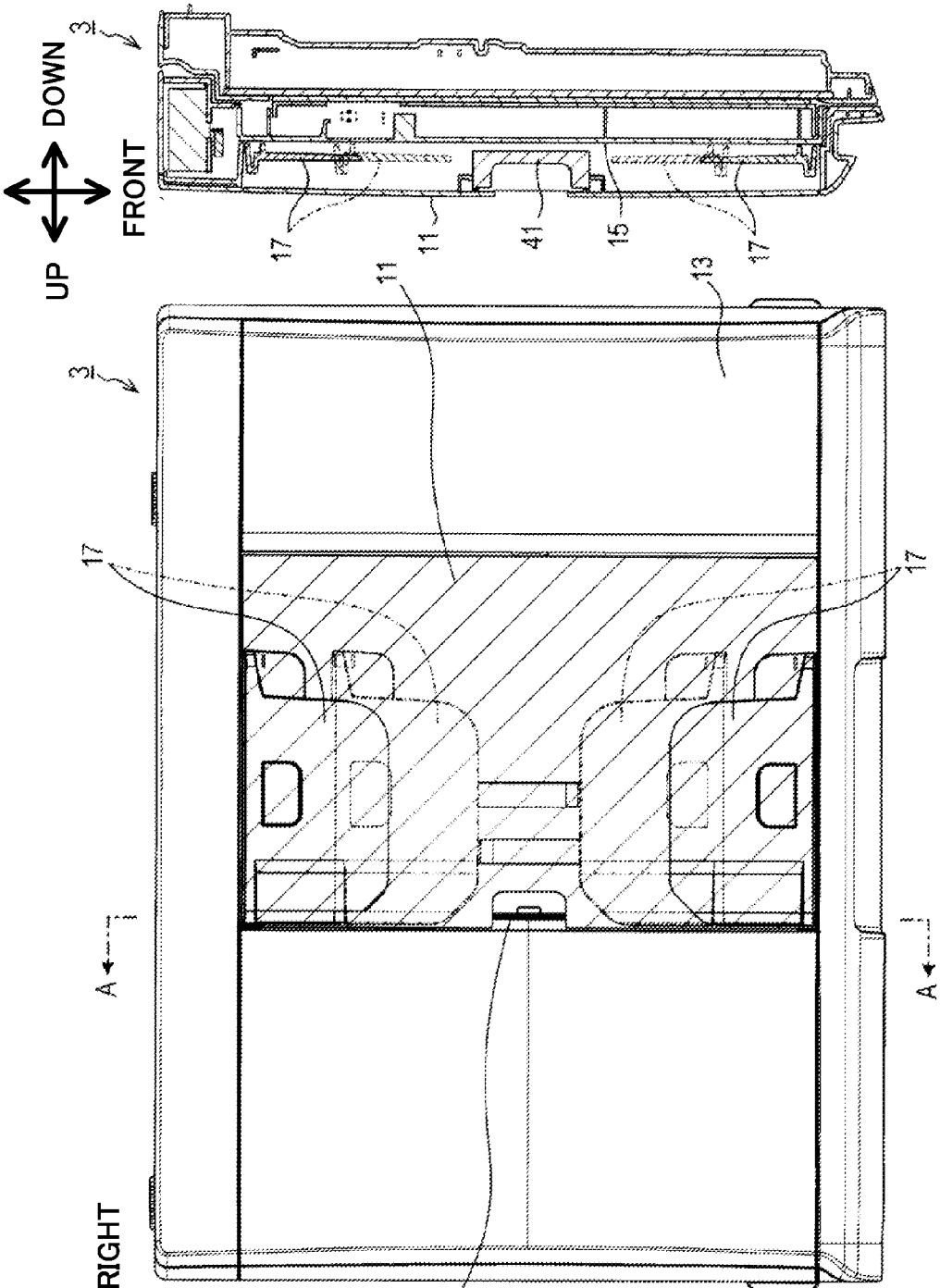
FIG. 4A is a plan view of the image reading apparatus.
FIG. 4B is a sectional view of the image reading apparatus taken along ling A-A of FIG. 4A.

As illustrated by the solid line and two-dot chain line in FIGS. 4A and 4B, the document guides 17 are slidable in the front-rear direction. When one of the document guides 17 is slid in a direction, the other of the document guides 17 is slid in the opposite direction at the same time. Therefore, by operating only one of the document guides 17, the document guides 17 can be slid in directions to make them closer to or separated from each other, whereby the distance between the document guides 17 can be changed.

The document guides 17 each include a partition plate 17a. The partition plates 17a are disposed above the main tray 15 with a gap therebetween.

As illustrated in FIG. 1B, when the subtray 11 is opened, a back surface 11b of the subtray 11 faces upward and is downwardly inclined toward the main tray 15. In this state, as illustrated in FIG. 3, a position P1 at an end of the subtray 11 that is adjacent to the main tray 15 is above a position P2 on the upper surface of the main tray 15 and is below a position P3 on the upper surfaces of the partition plates 17a.

An opening such as a recess 21 is formed in a portion that is below the rotation shaft 12 of the subtray 11 and that has a periphery continuous with the main tray 15 (a portion to the right of the main tray 15). The recess 21 is formed so that an end portion of the subtray 11 can pass therethrough including the end portion moving through a position below the surface of the main tray when the subtray 11 is rotated and the end portion of the subtray 11 moves to a position below the position P2 on the upper surface of the main tray 15.

The recess 21 prevents the end portion of the subtray 11 from contacting the portion that is continuous with the main tray 15, thereby allowing the subtray 11 to rotate smoothly. Due to the presence of the recess 21, the upper surface of the main tray 15 and the rotation shaft 12 can be positioned closer to each other in the height direction, whereby the height of the ADF unit 6 can be reduced.

A positioning portion 23 is disposed in the vicinity of the subtray 11. The positioning portion 23 restricts the subtray 11 from moving further from the open position (illustrated by two-dot chain line in FIGS. 2 and 3) while the subtray 11 is being opened.

The positioning portion 23 restricts the movement of the subtray 11 by contacting a contact piece 25 on the subtray 11 at a position at which the positioning portion 23 does not contact the surface of the subtray 11.

When the movement of the subtray 11 is restricted by the positioning member 23, the positioning member 23 causes a gap to be maintained between the surface 11a of the subtray 11 located on a side of the subtray 11 opposite to the surface of the subtray 11 configured to be used as a document placing surface and another member (in this illustrative embodiment, the upper cover 13) that is nearest to the surface 11a of the subtray 11.

To be specific, in the present illustrative embodiment, the upper cover 13 including surfaces 13a, 13b, and 13c is disposed so as to surround the subtray 11 and its surface 11a when the subtray 11 is closed. An inclined surface 13c forms a part of the upper cover 13 that is located close to the surface 11a of the subtray 11 when the subtray 11 is opened and in an open position.

The inclined surface 13c is inclined in a direction the same as that of the surface 11a of the subtray 11 that is in the open position, and a gap exists between the inclined surface 13c and the surface 11a of the subtray 11 in the open position. The gap between the inclined surface 13c and the surface 11a of the subtray 11 is sufficiently narrow within a range that allows contact between the surface 11a of the subtray 11 and the inclined surface 13c to be avoided, so that an excessively large recess is not formed in the upper surface of the ADF unit 6 when the subtray 11 is closed.

The positioning portion 23 causes a gap to be maintained between the surface 11a of the subtray 11 and the other member, whereby the surface 11a of the subtray 11 is prevented from being damaged by the inclined surface 13c of the upper cover 13.

The inclined surface 13c serves to make the inclination of the subtray 11 sufficiently gradual when the subtray 11 is open, whereby a document can be discharged smoothly.

As illustrated in FIGS. 5A and 5B, ribs 27a to 27g are formed on the back surface 11b of the subtray 11 so as to extend in a direction parallel to the document transport direction. The rib 27d, which is disposed at the center of the ribs 27a to 27g, protrudes to a height that is greater than a height of the ribs 27a to 27c and 27e to 27g, which are located on both sides of the rib 27d.

As illustrated in FIG. 2, a glass plate 31, which forms a document placing surface for a manual reading operation, is disposed on the upper side of the FB body 5. An image sensor 33 is disposed below the glass plate 31. In this illustrative embodiment, a contact image sensor is used as the image sensor 33. The image sensor 33 is reciprocally movable in the left-right direction in a space directly below the glass plate 31.

The ADF unit 6 includes a document transport unit such as document transport mechanism 35 that transports a document along a transport path illustrated by a broken line in FIG. 2. The document transport mechanism 35 includes drive rollers, pinch rollers, and the like. The drive rollers, which are driven by a motor, and the pinch rollers, which are rotated by the drive rollers, pinch a document therebetween. A document holder 37 is disposed above the glass plate 31. The document holder 37 presses a document, which is transported along the transport path described above, against the glass plate 31.

The subtray 11 having the structure described above is closed when the scanner unit 3 is used as an ADF scanner. The subtray 11 is not only used as a feed tray on which a document to be read by the ADF unit 6 is placed but also as a discharge tray onto which the document is discharged after being read.

To be specific, when a user opens the subtray 11 and sets a document to be read on the ADF unit 6, the document enters a space below the partition plates 17a. Thus, the upper surface of the main tray 15 and the back surface 11b of the subtray 11 are ready to be used as the feed tray.

In this state, the ribs 27a to 27g contact the document at the tops thereof. Therefore, the contact area between the ribs 27a to 27g and the document is sufficiently small, whereby the friction between the subtray 11 and the document is reduced. Because the amount of the projection of the rib 27d at the center is large, the document is slightly curved and forms an upward convex curved surface, whereby the document is prevented from bucking when transported in the transport direction.

By sliding the document guides 17 to positions at which the document guides 17 contact both sides of the document to be read, the document is aligned with the document guides 17 and prevented from being inclined relative to the transport direction.

After the document has been set in this way and when the user performs an operation to start ADF scan (for example, an operation on the operation panel 7 or a remote operation from a PC), the scanner unit 3 starts reading an image of the document.

To be specific, when the user performs an operation to start ADF scan, the image sensor 33 moves to a position directly below the document holder 37 and stops at the position. The rollers of the document transport mechanism 35 are driven, and the document that has been set on the ADF unit 6 is transported along the transport path illustrated by the broken line in FIG. 2.

The image sensor 33 reads an image of the document while the document is transported between the glass plate 31 and the document holder 37. The image sensor 33 repeatedly reads pixels arranged in the main scanning direction, which is the front-rear direction of the multifunction device 1, while the document is being moved in the sub-scanning direction, which is the transport direction.

After the document has been read, the document is discharged from the document transport mechanism 35 toward the upper side of the partition plates 17a and then transported onto the subtray 11. At this time, the upper surfaces of the partition plates 17a and the back surface 11b of the subtray 11 are used as a discharge tray.

When a plurality of documents is transported, documents that have been read are discharged onto documents that have not been transported so as to overlap. Because the rear ends of the discharged documents remain on the upper surfaces of the partition plates 17a, the discharged documents are prevented from being transported again.

A document stopper 41 is disposed at an end of the subtray 11. The document stopper 41 is configured to contact a document that has been discharged from the document transport mechanism 35 and thereby restricts the document from being moved further in a discharge direction.

Because the document stopper 41 contacts the leading end of a document that has been discharged, the document is restricted from being moved further even if the document is pushed by a document that is discharged later.

The document stopper 41 is movable between a first position at which the document stopper 41 contacts the leading end of an output document (illustrated by two-dot chain line in FIGS. 5A and 5C) and a second position at which the document stopper 41 does not contact the leading end of a discharged document (illustrated by two-dot chain line in FIGS. 5A and 5C).

Therefore, the document stopper 41 can be moved to the second position when the document stopper 41 is not to be used. For example, if a document is long in the transport direction, the document might become wrinkled, if the document contacts the document stopper 41. In such a case, the document is restricted from becoming wrinkled by moving the document stopper 41 to the second position.

As illustrated in FIG. 4B, the document stopper 41 protrudes from the subtray 11 by an amount such as to avoid contacting the main tray 15 even if the subtray 11 is closed when the document stopper 41 is in the first position.

Therefore, the document stopper 41 does not contact the main tray 15 even if the subtray 11 is closed when the document stopper 41 is in the first position, and the document stopper 41 and the main tray 15 can be prevented from being damaged.

The pair of document guides 17 are configured to not contact the document stopper 41 if the subtray 11 is closed when the distance between the document guides 17 is the smallest (as illustrated by two-dot chain line in FIGS. 4A and 4B). This structure can also prevent the document stopper 41 and the document guides 17 from being damaged.

The scanner unit 3 is used as an ADF scanner in the description above. However, the scanner unit 3 can be also used as an FB scanner. When using the scanner unit 3 as an FB scanner, a user opens the ADF unit 6 and places a document on the glass plate 31.

The ADF unit 6 can be rotated relative to the FB body 5 and can be moved up and down relative to the FB body 5. Therefore, by lifting the ADF unit 6 upward, a relatively thick document (for example, a book) can be placed between the FB body 5 and the ADF unit 6.

When a user has placed a document on the glass plate 31 and performs an operation to start FB scan (for example, an operation on the operation panel 7 or a remote command from a PC), the scanner unit 3 starts reading an image from the document. When reading of an image is started, the image sensor 33 repeatedly reads pixels arranged in the main scanning direction, which is the rear-back direction of the multifunction device 1, while moving below the glass plate 31 in the sub-scanning direction, which is the left-right direction of the multifunction device 1.

As described above, in the multifunction device 1, the subtray 11 can be used as a feed tray and a discharge tray when the subtray 11 is opened. The multifunction device 1 has a compact structure as compared with a device having a feed tray and an output tray independently.

When the subtray 11 is closed, the back surface 11b of the subtray 11, which is used as a document placing surface in an automatic document feeding operation, faces downward and the subtray 11 is disposed above the main tray 15. Therefore, collection of dust and foreign objects on the back surface 11b of the subtray 11 and the upper surface of the main tray 15 can be reduced or controlled.

A document to be transported is placed on the main tray 15 at a position below the partition plates 17a, and a document is discharged onto the upper surfaces of the partition plates 17a. Therefore, as compared with a case where the partition plates 17a are not provided, the contact area between a transported document and a document not transported is reduced, whereby occurrence of jamming or the like can be controlled.

In the multifunction device 1, when the subtray 11 is opened, the position P1 of the end portion of the subtray 11 is above the position P2 on the upper surface of the main tray 15 and below the position P3 on the upper surfaces of the partition plates 17a (see FIG. 3). Therefore, a document that is transported moves along the back surface 11b of the subtray 11 and then moves onto an upper surface of the main tray 15, which is below the back surface 11b of the subtray 11. A document that is discharged moves along the upper surfaces of the partition plates 17a and then moves to the back surface 11b of the subtray 11, which is below the upper surfaces of the partition plates 17a.

Therefore, the leading end of a document can be prevented from being caught by the main tray 15 or the subtray 11, as compared with a case where the upper surface of the main tray 15 is positioned above the back surface 11b of the subtray 11 or a case where the back surface 11b of the subtray 11 is positioned above the upper surfaces of the partition plates 17a.

The present invention is not limited to the illustrative embodiment described above, and can be modified in various ways.

For example, in the illustrative embodiment described above, a part of the document transport path that is upstream of a path for reversing the direction of a document is disposed above a part of the document transport path that is downstream of the path for reversing the direction of the document. The structure of the present invention can be used even if the document transport direction is the opposite to that of the illustrative embodiment described above.

In the illustrative embodiment described above, the scanner unit 3 is included in the multifunction device 1. However, the scanner unit 3 may be a single-function image scanner.

While an image reading apparatus is discussed above, it will be appreciated that other types of image forming apparatuses may be used. For example, the scanner unit 3 may be replaced with a printing apparatus such that the ADF 6 may be utilized in the printing apparatus. In this instance, a document being fed may be a blank recording medium and the image sensor may be replaced with a printing unit (e.g., a print head). In this case the document, a blank recording medium, may be fed by the ADF 6 through the document transport path and the printing unit can print an image on the document. Thereafter, the ADF 6 can discharge the document onto a document guide 17a and a subtray 11 functioning as a discharge tray.

What is claimed is:

1. An image forming apparatus comprising:
a document transport unit configured to transport a document along a predetermined transport path;
a first tray that is disposed adjacent to the document transport unit;
a first document guide disposed above the first tray;
a second document guide disposed above the first tray, wherein each of the first and second document guides includes a plate that is disposed above the first tray with a gap therebetween, wherein the first document guide and the second document guide are slidable in a direction perpendicular to the transport path;
a second tray that is configured to be opened and closed, the second tray being located above the first tray and having a surface facing downward when the second tray is closed, and facing upward when the second tray is in an open position in which the surface of the second tray is configured to be used as a document placing surface;
a rotation member configured to rotatably support the second tray;
a contact member positioned at an edge of the surface of the second tray in a width direction; and
a positioning member configured to contact the contact member thereby restricting movement of the second tray beyond the open position;
wherein the positioning member is positioned above the edge of the surface of the second tray in the width direction, and between (i) a line extending perpendicular to the surface of the second tray and through the rotation member and (ii) a line extending perpendicular to the surface of the second tray and through an end portion of the second tray that is closest to the first tray when the second tray is in the open position;
wherein the end portion of the second tray does not contact the first tray when the second tray is in the open position;
wherein, when the second tray is in the open position, the surface of the second tray and a surface of the first tray are configured to be used as a feed tray on which a document to be fed to the document transport unit is placed, and the surface of the second tray, a surface of the plate of the first document guide, and a surface of the plate of the second document guide are configured to be used as a discharge tray on which a document that is discharged from the document transport unit is placed, and further wherein, when the second tray is in the open position, the end portion of the second tray is entirely above the surface of the first tray and entirely below the surface of the first document guide.

2. The image forming apparatus according to claim 1, further comprising:
an opening formed into a portion of the first tray that is below the rotation member, the opening allowing an end portion of the second tray to pass therethrough including the end portion moving through a position below the surface of the first tray when the second tray rotates around the rotation member.

3. The image forming apparatus according to claim 2, wherein a periphery of the opening is continuous with the first tray.

4. The image forming apparatus according to claim 1, wherein the positioning member restricts the movement of the second tray at a position at which the positioning member does not contact the surface of the second tray, the positioning member causing a gap to be maintained between a second surface of the second tray, located on a side of the second tray opposite to the surface of the second tray configured to be used as the document placing surface, and a second member when the positioning member restricts the movement of the second tray.

5. The image forming apparatus according to claim 1, further comprising:
a cover that surrounds the second tray when the second tray is closed, the cover including an inclined surface, wherein a second surface of the second tray approaches the inclined surface when the second tray is opened, the inclined surface being inclined in a direction the same as the second surface of the second tray in the open position.

6. The image forming apparatus according to claim 1, wherein a plurality of ribs is formed on the surface of the second tray so as to extend in a direction parallel to the document transport path.

7. The image forming apparatus according to claim 6, wherein a central one of the plurality of ribs has a height greater than a height of each of the ribs that is disposed on either side of the central one of the ribs.

8. The image forming apparatus according to claim 1, further comprising:
a document stopper disposed at an end portion of the second tray, the document stopper configured to contact a leading end of a document that is discharged and restrict the document from being moved further in a discharge direction.

9. The image forming apparatus according to claim 8, wherein the document stopper is movable between a first position in which the document stopper restricts the document from being moved further in a discharge direction and a second position in which the document stopper does not restrict the document from being moved further in a discharge direction.

10. The image forming apparatus according to claim 9, wherein the document stopper is configured to protrude from the second tray to a height at which the document stopper does not contact the first tray when the second tray is closed while the document stopper is in the first position.

11. The image forming apparatus according to claim 10, wherein, when the second tray is in the open position, the surface of the second tray and a surface of the first tray are configured to be used as the feed tray, and the surface of the second tray and a surface of the first document guide are configured to be used as the discharge tray, and wherein the first document guide is configured such that the document stopper does not contact the first document guide when the second tray is closed.

12. The image forming apparatus according to claim 11, wherein the first and second document guides are configured such that the document stopper does not contact the first and second document guides when the second tray is closed while the first and second document guides are at positions at which the distance therebetween is the smallest.

13. The image forming apparatus according to claim 1, further comprising:
an image sensor configured to read an image of the document transported by the document transport unit.

14. An image forming apparatus comprising:
a document transport unit configured to transport a document along a predetermined transport path;
a first tray that is disposed adjacent to the document transport unit;
a first document guide disposed above the first tray;
a second document guide disposed above the first tray, wherein each of the first and second document guides includes a plate that is disposed above the first tray with a gap therebetween, wherein the first document guide and the second document guide are slidable in a direction perpendicular to the transport path;
a second tray that is configured to be opened and closed, the second tray having a surface facing the first tray when the second tray is closed, and the surface facing away from the first tray when the second tray is in an open position in which the surface of the second tray is configured to be used as a document placing surface;
a rotation member configured to rotatably support the second tray;
a contact member positioned at an edge of the surface of the second tray in a width direction; and
a positioning member configured to contact the contact member thereby restricting movement of the second tray beyond the open position;
wherein the positioning member is positioned above the edge of the surface of the second tray in the width direction, and between (i) a line extending perpendicular to the surface of the second tray and through the rotation member and (ii) a line extending perpendicular to the surface of the second tray and through an end portion of the second tray that is closest to the first tray when the second tray is in the open position;
wherein the end portion of the second tray does not contact the first tray when the second tray is in the open position;
wherein, when the second tray is in the open position, the surface of the second tray and a surface of the first tray are configured to be used as a feed tray on which a document to be fed to the document transport unit is placed, and the surface of the second tray, a surface of the plate of the first document guide, and a surface of the plate of the second document guide are configured to be used as a discharge tray on which a document that is discharged from the document transport unit is placed, and further wherein, when the second tray is in the open position, the end portion of the second tray is entirely above the surface of the first tray and entirely below the surface of the first document guide.

15. The image forming apparatus according to claim 14, further comprising:
an opening formed in a portion that is below the rotation member, the opening allowing an end portion of the second tray to pass therethrough including the end portion moving through a position below the surface of the first tray when the second tray rotates around the rotation member.

16. The image forming apparatus according to claim 14, wherein the positioning member restricts the movement of the second tray at a position at which the positioning member does not contact the surface of the second tray, the positioning member causing a gap to be maintained between a second surface of the second tray, located on a side of the second tray opposite to the surface of the second tray configured to be used as the document placing surface, and a second member when the positioning member restricts the movement of the second tray.

17. The image forming apparatus according to claim 14, further comprising:
a second document guide disposed above the first tray, each of the first and second document guides including a plate that is disposed above the first tray with a gap therebetween, where when the second tray is in the open position, the surface of the second tray, the surface of the first document guide and a surface of the second document guide are configured to be used as the discharge tray.

18. An image forming apparatus comprising:
a document transport unit configured to transport a document along a predetermined transport path;
a first tray that is disposed adjacent to the document transport unit;
a slidable document guide comprising a first document guide and a second document guide disposed above the first tray, wherein the first document guide, the second document guide, or both are configured to be slidable in a direction perpendicular to the transport path;
a second tray that is configured to be opened and closed, the second tray being located above the first tray and having a surface facing downward when the second tray is closed, and facing upward when the second tray is an open position in which the surface of the second tray is configured to be used as a document placing surface;
a rotation member configured to rotatably support the second tray;
a contact member positioned at an edge of the surface of the second tray in a width direction; and
a positioning member configured to contact the contact member thereby restricting movement of the second tray beyond the open position;
wherein the positioning member is positioned above the edge of the surface of the second tray in the width direction, and between the rotation member and an end portion of the second tray that is closest to the first tray when the second tray is in the open position;
wherein the end portion of the second tray does not contact the first tray when the second tray is in the open position;
the slidable document guide including a plate that is disposed above the first tray with gap therebetween, wherein when the second tray is in the open position, the surface of the second tray and a surface of the first tray are configured to be used as a feed tray on which the document to be fed to the document transport unit is placed, and the surface of the second tray and a surface of the plate of the slidable document guide are configured to be used as a discharge tray on which a document that is discharged from the document transport unit is placed, and further wherein, when the second tray is in the open position, the end portion of the second tray is entirely above the surface of the first tray and entirely below the surface of the first document guide.

* * * * *